(12) United States Patent
Apellido (10) Patent No.: US 8,505,446 B2
(45) Date of Patent: Aug. 13, 2013

(54) PLANT FOR DRYING AND RIPENING FOOD PRODUCTS AND METHOD FOR TRANSFERRING SUCH PRODUCTS WITHIN SAID PLANT

(75) Inventor: Narcis Apellido, Girona (ES)

(73) Assignee: Metalquimia S.A., Girona (ES)

( * ) Notice: Subject to any disclaimer, the term of this patent is extended or adjusted under 35 U.S.C. 154(b) by 240 days.

(21) Appl. No.: 13/139,915

(22) PCT Filed: Dec. 14, 2009

(86) PCT No.: PCT/ES2009/000570
§ 371 (c)(1),
(2), (4) Date: Jun. 23, 2011

(87) PCT Pub. No.: WO2010/072859
PCT Pub. Date: Jul. 1, 2010

(65) Prior Publication Data
US 2011/0250335 A1    Oct. 13, 2011

(30) Foreign Application Priority Data

Dec. 26, 2008   (ES) .................................. 200803702

(51) Int. Cl.
*A23L 3/3418* (2006.01)

(52) U.S. Cl.
USPC ............... 99/477; 99/478; 99/479; 99/467; 99/443 C; 99/470; 426/465; 426/443; 414/788.8

(58) Field of Classification Search
USPC ............. 99/477, 478, 479, 467, 470, 443 C; 426/443, 465; 414/788.4, 788.8, 331.14, 414/416.03, 416.04, 923; 422/63, 65
See application file for complete search history.

(56) References Cited

U.S. PATENT DOCUMENTS

| | | | | |
|---|---|---|---|---|
| 3,101,851 A * | 8/1963 | Heide et al. | ............... | 414/788.4 |
| 3,782,931 A * | 1/1974 | Brede, III et al. | ............... | 419/57 |
| 3,790,336 A * | 2/1974 | Brede et al. | .................. | 432/163 |
| 3,802,832 A * | 4/1974 | Nicolaus | ....................... | 432/128 |
| 3,889,009 A * | 6/1975 | Lipoma | ......................... | 426/234 |
| 3,976,208 A | 8/1976 | Buix et al. | | |
| 4,525,978 A * | 7/1985 | Hayase et al. | .................. | 53/167 |
| 5,143,558 A * | 9/1992 | Smith | ........................... | 148/225 |
| 5,324,366 A * | 6/1994 | Keil et al. | ..................... | 148/207 |
| 5,577,908 A * | 11/1996 | Glascock | ...................... | 432/239 |
| 6,183,186 B1 * | 2/2001 | Howells et al. | ........... | 414/416.03 |
| 6,360,792 B1 * | 3/2002 | Ganz et al. | ..................... | 141/129 |
| 7,228,791 B2 * | 6/2007 | Habermann et al. | ............ | 99/330 |

FOREIGN PATENT DOCUMENTS

| | | |
|---|---|---|
| EP | 0075531 A2 | 3/1983 |
| FR | 2662998 A1 * | 12/1991 |
| JP | 10077120 A * | 3/1998 |
| WO | WO 2008135616 A1 * | 11/2008 |

* cited by examiner

*Primary Examiner* — Henry Yuen
*Assistant Examiner* — John J Norton
(74) *Attorney, Agent, or Firm* — Hess Patent Law Firm LLC; Robert J. Hess (57) ABSTRACT

A plant has a line to convey trays and a processing chamber under modified atmospheric conditions that has a regulating chamber with gates at an entrance and a regulating chamber (9) with gates at an exit to introduce and extract trays with foodstuff. Before the input regulating chamber there is a stacking device for stacking trays, after the exit of the input regulating chamber (4) and inside the processing chamber there is an unstacking device, and transfer device are arranged to introduce stacks of trays in the processing chamber through the regulating chamber in order to provide sufficient time to regulate the atmospheric conditions in the regulating chamber without lowering the advance rate of the trays in the line.

16 Claims, 9 Drawing Sheets

PLANT FOR DRYING AND RIPENING FOOD PRODUCTS AND METHOD FOR TRANSFERRING SUCH PRODUCTS WITHIN SAID PLANT

FIELD OF THE ART

The present invention relates in general to a plant for drying and maturing foodstuffs and, more particularly, to a plant for drying and maturing foodstuffs cut into slivers or slices and arranged on trays.

BACKGROUND OF THE INVENTION

International patent application WO 2005092109 describes a method for drying and maturing raw meat products cut into slivers or slices, including the steps of partially drying the slivers or slices under a pressure lower than 75 mbar and a product temperature between −2° C. and 40° C. achieving a reduction of 10% to 40% in weight compared to the weight of the slivers or slices before the partial drying; applying a modified atmosphere to the product, containing not more than 1% oxygen; and maturing the meat products in slivers or slices in said modified atmosphere at a temperature between 0° C. and 40° C. However, that document does not describe a device for implementing said method.

International patent application WO 2008135616 discloses a device for drying and maturing foodstuffs that implements a method analogous or similar to that described in the aforementioned international patent application WO 2005092109. The device comprises a processing chamber connected to conditioning means to create predetermined environmental conditions in its interior, input and output gate devices configured to allow for the orderly input of slivers or slices of foodstuff to the interior of the processing chamber and the output of the slivers or slices of foodstuff from the interior of the processing chamber without altering said predetermined environmental conditions inside the processing chamber, and an inner conveying device installed inside the processing chamber and arranged to orderly convey the portions of foodstuff from said input gate device to said output gate device along a route including several horizontal overlapping conveyor sections actuated in opposite directions. A drawback of this device is that the slivers or slices should be maintained in an orderly formation during their displacement along a path that includes at least the passage through the input gate device, the route along several sections of the inner conveyor, and the passage through transfer devices in order to change from a section of the inner conveyor to the next one, and this greatly complicates mechanisms and makes the apparatus hardly operational.

Patents JP-A-58078575 and EP-A-0691272 describe various appliances for the processing of foodstuffs in a processing chamber wherein modified atmospheric conditions prevail. In the devices of these documents, foodstuffs are arranged on trays, and regulating chambers are used with gate devices at the entrance and the exit of the processing chamber to enable the introduction and extraction of the trays without substantially altering said modified atmospheric conditions. Regulating chambers have an input gate and an output gate, and they are sized to fully accommodate a tray loaded with foodstuffs when both gates are closed. The input and output gates of each regulating chamber are actuated to open and close alternately so that at least one of them is closed at all times. A system of valves is used to alternately match the atmospheric conditions inside the corresponding regulating chamber to the atmospheric conditions inside the processing chamber and outside atmospheric conditions with the actuation of the gates. A drawback of these devices is that, because of the considerable volume of the regulating chambers required to be able to fully accommodate a tray loaded with foodstuffs, the time required to regulate the atmospheric conditions inside said regulating chambers is relatively long, and, when the device is installed in a production line, this limits the advance rate of the trays along the line even if the rest of the devices in the line are capable of higher advance rates.

DISCLOSURE OF THE INVENTION

Therefore, an objective of the present invention is to provide a plant for drying and maturing foodstuffs, wherein the foodstuffs are cut into portions and arranged on trays for their conveyance along at least one production line including a processing chamber with an inner conveyor. Another objective of the present invention is to provide gate devices at the entrance and the exit to the processing chamber associated to conveyor means that allow for the introduction and extraction of trays to and from the processing chamber at a rate that does not substantially limit the advance rate of the trays along the line.

The present invention contributes to achieving these and other objectives by providing a plant for drying and maturing foodstuffs, which includes input conveying means to transport trays loaded with portions of a foodstuff, a processing chamber connected to conditioning means to create modified atmospheric conditions inside said chamber and output conveying means. The atmospheric conditions inside the chamber can include, for instance, a pressure lower or higher than atmospheric pressure, a temperature higher or lower than ambient temperature, a gas mixture with components or proportions different from those of air, the control of the percentage of oxygen, etc. The said processing chamber has input and output gate devices and an inner conveyor to carry trays loaded from said input gate device to said output gate device along a path inside the processing chamber. The afore-mentioned input gate device comprises an input regulating chamber, an outer input gate between said input regulating chamber and the outside, and an inner input gate arranged between the input regulating chamber and the inside of the processing chamber, drive means to alternately open and close said outer and inner input gates so that, at any time, at least one of them is closed, and regulating means operable to match the atmospheric conditions inside the input regulating chamber to the outside atmospheric conditions before the outer input gate is opened and to the modified atmospheric conditions inside the processing chamber before the inner input gate is opened.

To take the trays loaded with foodstuff portions from the input conveying means inside the processing chamber through the input gate device, input transfer means are provided comprising an input stacking device arranged before the input regulating chamber that forms stacks of a predetermined number of trays with loaded trays coming from the input conveying means, an input unstacking device arranged after the input regulating chamber inside the processing chamber that unstacks the stacks of loaded trays and individually delivers the loaded trays to said input conveying device, and an input transfer device arranged to transfer each of said stacks of loaded trays from said input stacking device to the input regulating chamber when the outer input gate is opened, to keep each stack of loaded trays in the input regulating chamber with the outer and inner input gates closed long enough to allow for matching the atmospheric conditions inside the input regulating chamber to the modified atmospheric conditions inside the processing chamber, and to transfer each stack of loaded trays from the input regulating chamber to said input unstacking device when the inner input gate is open.

With this arrangement, while the input stacking device is receiving and stacking loaded trays at the rate they are delivered by the input conveying means, the input transfer device moves the stacks of loaded trays from the input stacking device on the outside to the input unstacking device inside the processing chamber through the input gate device at the significantly lower rate required for the input gate device to be able to carry out the afore-mentioned gate opening and closing operations and the regulation of atmospheric conditions. Inside the processing chamber, the input unstacking device can unstack the stacks of loaded trays received from the input transfer device and individually deliver the loaded trays to said input conveying device at the same rate that the input transfer means deliver loaded trays to the input stacking device. This way, although the rate at which the operations of tray transfer, opening and closing of gates and the regulation of atmospheric conditions in the input gate device is clearly lower than the advance rate of the individual trays along the line, the fact that trays are transferred in groups forming stacks through the input gate device causes the operation of the input gate device not to limit the overall advance rate of the loaded trays along the line. For instance, transferring stacks of three loaded trays, the advance rate of the loaded trays along the line can be three times higher than the rate at which the operations of tray transfer, opening and closing of gates and the regulation of atmospheric conditions in the input gate device occur.

It should be noted that the portions of the foodstuff are usually relatively thin slivers or slices of a meat product, although fish products or vegetable products are not ruled out. This means the trays can have a proportionally small height in relation to its support surface area, i.e. in connection with its dimensions of width and length. Therefore, a stack with a few trays, for example two, three or four trays, continues to have a proportionally small height in relation to the width and length of a tray, and does not significantly increase the volume needed in the regulating chamber, and, instead, multiplies by two, three or four the time available for operations of tray transfer, opening and closing of gates and the regulation of atmospheric conditions in the regulating chamber without altering the overall advance rate of the trays along the line.

The output gate device is similar to the input gate device, and it comprises an output regulating chamber, an inner output gate arranged between the processing chamber and said output regulating chamber, an outer output gate arranged between the output regulating chamber and the outside, drive means to alternately open and close said inner and outer output gates so that, at any time, at least one of them is closed, and regulating means operable to match the atmospheric conditions inside the output regulating chamber to the modified atmospheric conditions inside the processing chamber before the inner output gate is opened and to the atmospheric conditions outside before the outer output gate is opened. The output gate device has associated output transfer means comprising an output stacking device arranged inside the processing chamber before the output regulating chamber that forms stacks of a predetermined number of trays with loaded trays coming from the inner conveying device, an output unstacking device arranged after the output regulating chamber that unstacks the stacks of loaded trays and individually delivers the loaded trays to output conveying means, and an output transfer device arranged to transfer each of said stacks of loaded trays from said output stacking device to the output regulating chamber when the inner output gate is opened, to keep each stack of loaded trays in the output regulating chamber with the inner and outer output gates closed long enough to allow for matching the atmospheric conditions inside the output regulating chamber to the modified atmospheric conditions outside, and to transfer each stack of loaded trays from the output regulating chamber to said output unstacking device when the outer output gate is open.

It is to be noted that the operation of the output transfer device is similar to the input transfer device and it allows carrying out the operations of opening and closing the gates and the regulation of the atmospheric conditions in the output gate device without limiting the overall advance rate of the loaded trays along the line.

To maximize the length of the route of the loaded trays inside the processing chamber, the inner conveying device comprises several horizontal superimposed sections actuated so as to move in opposite alternate directions. The leading end of each conveyor section, except for the leading end of the upper conveyor section, is arranged to receive the loaded trays from the trailing end of the conveyor section immediately above. This way, the route of the loaded trays inside the processing chamber is significantly longer than the length of the same. At the end of each conveyor section, except at the end of the lower conveyor section, an inner conveying device is arranged for transferring the trays to the conveyor section immediately below. From the end of the lower conveyor section, loaded trays are transferred to the output stacking device.

BRIEF DESCRIPTION OF THE DRAWINGS

These and other features and advantages will be more fully understood from the following detailed description of exemplary embodiments with reference to the accompanying drawings, in which.

DETAILED DESCRIPTION OF EXEMPLARY EMBODIMENTS

Figure 1:
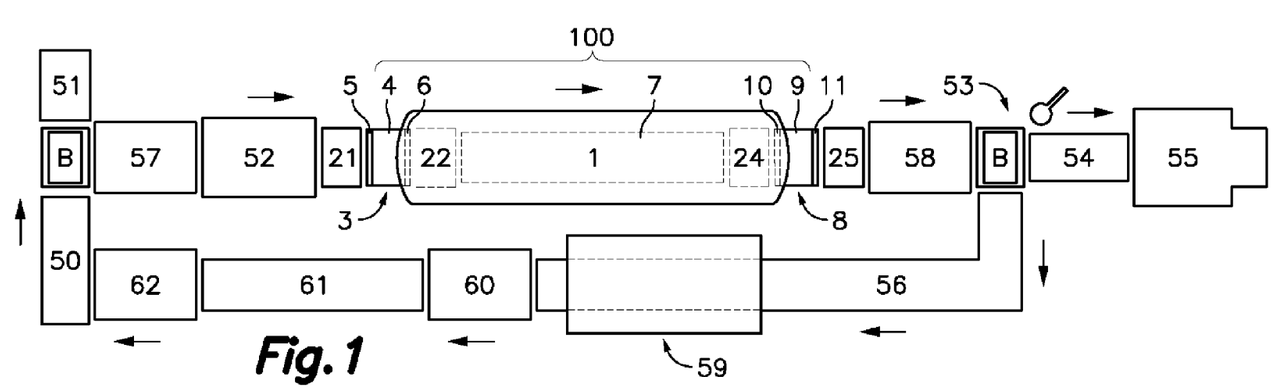
FIG. 1 is a schematic plan representation of the arrangement of a plant for drying and maturing foodstuffs according to an exemplary embodiment of the present invention including a drying and maturing line.

Referring first to FIG. 1, the plant for drying and maturing foodstuffs according to an exemplary embodiment of the present invention comprises a series of linked units through which foodstuffs are continuously conveyed arranged on successive trays B. The route of trays B along the plant is carried out in a line advance direction indicated by arrows. The foodstuffs to be treated are typically initially raw and optionally frozen meat products cut into slivers or slices, although processing of fish products or vegetable products is not ruled out. The processing units included in the plant are a thermal processing unit 52 and a modified atmospheric conditions processing unit 100.

Figure 3:
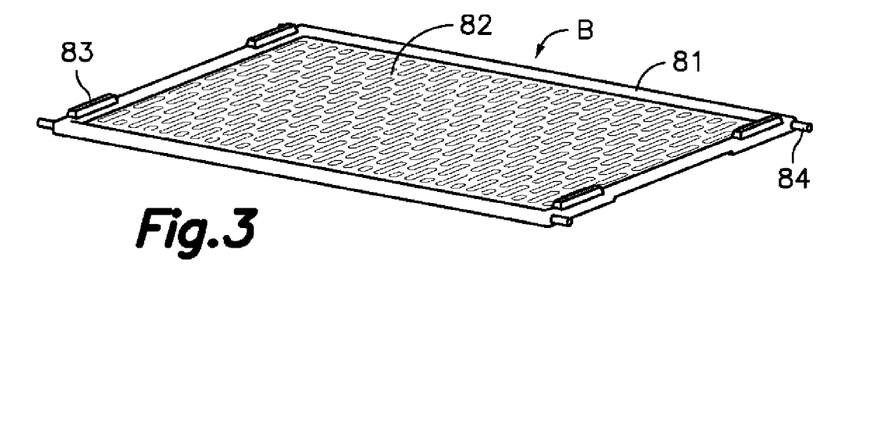
FIG. 3 is a perspective view of a tray used to convey foodstuffs along production lines.
Figure 4:
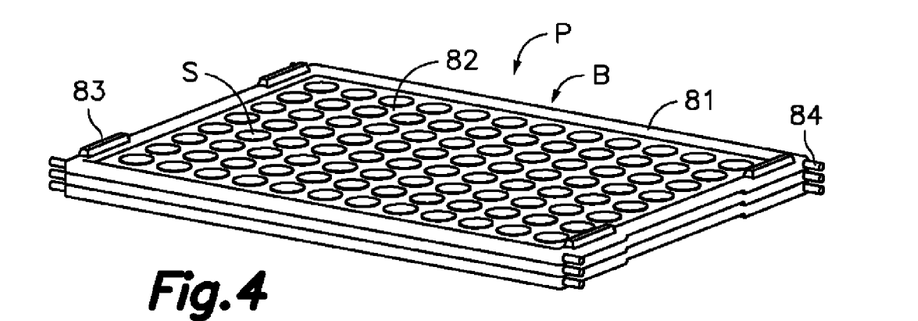
FIG. 4 is a perspective view of a stack of three trays similar to the tray in FIG. 3 loaded with slivers or slices of foodstuff.

FIGS. 3 and 4 show an example of a tray B adequate to be used in the plant of the present invention. Tray B (FIG. 3) has a perimetrical rectangularly-shaped frame 81 surrounding a support surface 82, preferably perforated and depressed relative to said perimetrical frame 81, on which the slivers or slices S of foodstuff are orderly arranged, for instance in a matrix layout as shown in FIG. 4. Since the slivers or slices S are relatively thin, the depth of the support surface 82 may be relatively small and the height of the tray is very low in relation to its length and width. In an upper part of the perimetrical frame 81 there are projections 83 configured and arranged to fit in recesses (not shown) formed in a lower part of the perimetrical frame 81 of another identical tray B when several trays are superimposed to form a stack P, as shown in FIG. 4. The stack P shown in FIG. 4 has three trays B, and, given the small height of each tray B, the relationship between the height of stack P and its width or length is still low. However, with this model of tray, stable stacks of up to fifteen or more trays B can be formed. From opposite ends of the perimetrical frame 81 support shanks 84 extend that are used to position, support, and push tray B in some of the conveyor means of the plant of the present invention, as it will be shown below. Trays B can be made of a material suitable for food applications, whether it be a plastic material, such as, for example, polyester or ABS, or a metallic material such as stainless steel.

Figure 5:
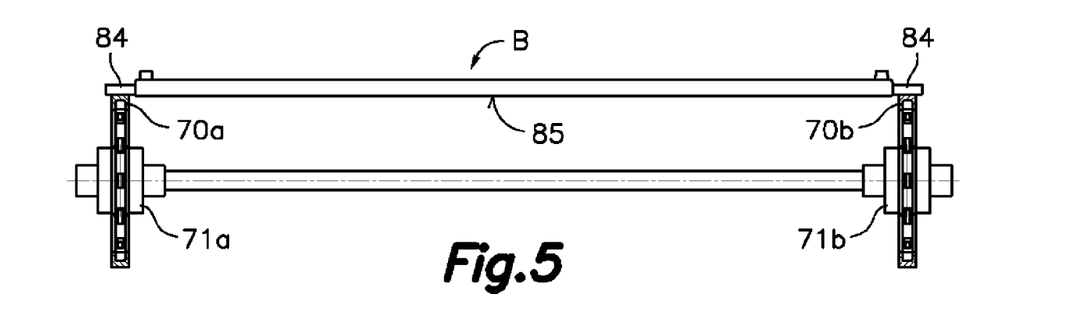
FIG. 5 is a side view of the tray in FIG. 3 with its shanks being supported on a belt or chain conveyor.

In FIG. 5 there is shown, by way of example, a tray B arranged in a horizontal position, its support shanks 84 being supported on belts or chains 70a, 70b of a belt or chain conveyor 70. The said belts or chains 70a, 70b are substantially parallel and are guided by wheels 71a, 71b, some of which can be driven to move the belts or chains 70a, 70b, and with them tray B. Although they are not shown in FIG. 5, the belts or chains 70a, 70b may be provided with holding configurations, such as, for instance, projections or notches, suitable for engaging the support shanks 84 of tray B, thereby ensuring its positive dragging, as will be seen below. However, as it will also be seen below, tray B can be alternatively moved with its underside 85 being supported on the belts or chains of a belt or chain conveyor or a band of a band conveyor, etc.

Returning to the plant of FIG. 1, it comprises a loading unit 51 that includes a slicer for cutting the foodstuffs into slivers or slices and a loading device to load said slivers or slices on successive trays B coming from a first empty tray conveyor 50. Next, there is the afore-mentioned thermal processing unit 52, which includes a thermal processing enclosure in connection with means for air circulation at a controlled temperature that cause the air to circulate at said controlled temperature through said heating enclosure, and a device to feed loaded trays B, coming from said loading unit 51, from an entrance, along a route inside the thermal processing enclosure and towards an exit. Thermal processing unit 52 may be a known type in which the input of trays is located in a lower part and the output in an upper part, and trays are gradually lifted in a vertical direction from the bottom to the top. Optionally, to regulate the transit of loaded trays B between the loading unit 51 and the thermal processing unit 52 a first intermediate storage device 57 is arranged provided with means to pile up and temporarily retain loaded trays B and deliver them individually to the thermal processing unit 52 at the required rate.

After the thermal processing unit 52 there is the above-mentioned modified atmospheric conditions processing unit 100 (best shown in FIG. 6), which essentially comprises a closed processing chamber 1 connected to suitable conditioning means to create modified atmospheric conditions inside it. This processing chamber 1 has an input gate device 3, an output gate device 8 and an inner conveying device 7 for conveying trays B from said input gate device 3 to said output gate device 8 along a route inside the processing chamber 1. The line includes input transfer means 21, 22 configured to introduce loaded trays B, coming from the thermal processing unit 52, from the outside to the inside of the processing chamber 1 through the input gate device 3, and output transfer means 24, 25 configured to extract loaded trays B from the inside to the outside of the processing chamber 1 through the output gate device 8 without substantially altering the modified atmosphere inside the processing chamber 1.

Trays B loaded with the treated foodstuff coming from the modified atmospheric conditions processing unit 100 are led towards an unloading unit 53. Optionally, between the exit of the processing chamber 1 and said unloading unit 53 a second intermediate storage device 58 is arranged, which can be similar to the first intermediate storage device 57 described above. In the exemplary embodiment illustrated in FIG. 1, this second intermediate storage device 58 is configured to handle individual trays B and is arranged to regulate the transit of loaded trays B between the output unstacking device 25 and the unloading unit 53. It is to be noted that, alternatively, the second intermediate storage device 58 could be configured to handle stacks P of trays B instead of individual trays, and be arranged to regulate the transit of stacks P of loaded trays B between the exit of the output regulating chamber 9 and the output unstacking device 25.

The unloading unit comprises means to unload the slivers or slices of processed foodstuff from trays B coming from the output unstacking device 25, to deliver, on one hand, the processed slivers or slices to an accumulating and cooling device 54 and to deliver, on the other hand, empty trays B to a second empty tray conveyor 56, which is a return conveyor in connection with the above-mentioned first empty tray conveyor 50. The slivers or slices of processed foodstuffs are led from said accumulating and cooling device 54 to a packaging unit 55, which includes, for instance, a thermoforming machine or a vacuum packaging device, where the slivers or slices are packaged. The unloading unit 53 can comprise one or more robotic arms or a bridging manipulator configured to handle gripping members based, for instance, on suction cups. For example, a bridging manipulator can handle a gripping member wherein an array of suction cups is arranged coinciding with the array of slivers or slices of foodstuff arranged on the support surface 82 of tray B (see FIGS. 3 and 4).

The afore-mentioned second empty tray conveyor 56 is configured and arranged to cause the empty trays to go through a tray-washing tunnel 59 in order to be able to deliver the empty trays to said first empty tray conveyor 50 in an appropriate state of cleanliness to ensure good health conditions. Preferably, to regulate the transit of empty, clean trays B between the exit of the washing tunnel 59 and the first empty tray conveyor 50, the plant includes an empty tray stacking device 60 configured to form stacks of a predetermined number of trays with the empty trays B coming from the washing tunnel 59, an empty tray unstacking device 62 to unstack empty, clean trays coming from said empty tray stacking device 60 and individually deliver empty, clean trays B to the first empty tray conveyor 50, and a tray stack conveyor 61 to convey stacks of clean, empty trays from the empty tray stacking device 60 to the empty tray unstacking device 62. The stacks of clean, empty trays in this return conveyor can be of up to 15 or more trays B.

Figure 2:
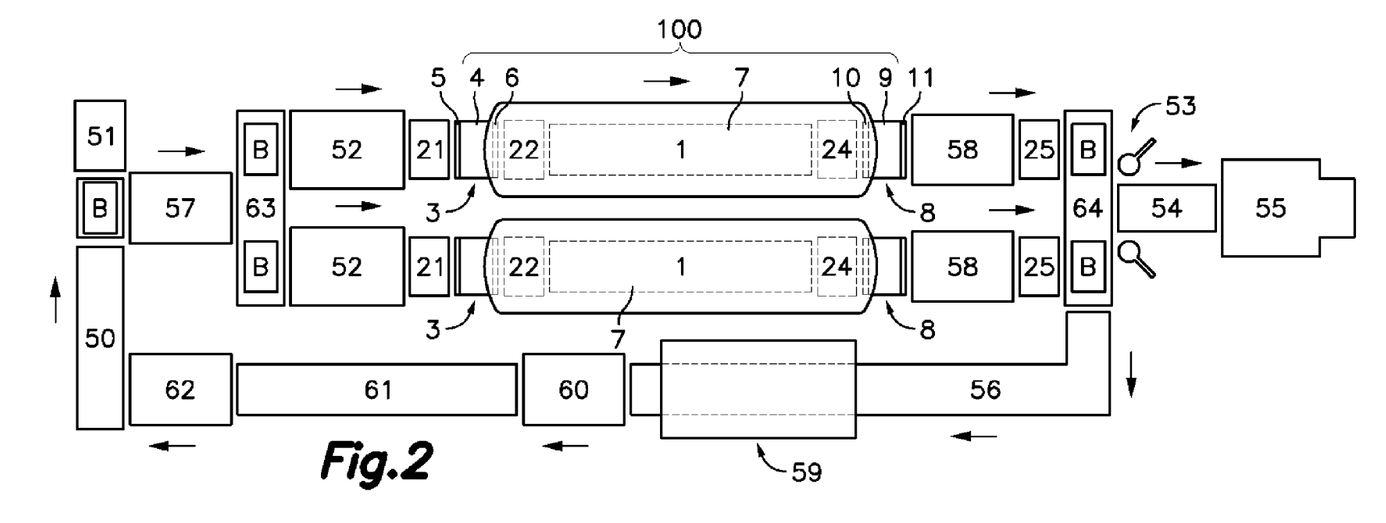
FIG. 2 is a schematic plan representation of the arrangement of a plant for drying and maturing foodstuffs according to another exemplary embodiment of the present invention including two drying and maturing lines.

FIG. 2 shows a plant for drying and maturing foodstuffs according to another exemplary embodiment of the present invention, which is entirely analogous to the exemplary embodiment described above in relation to FIG. 1, except in that, here, the plant includes two drying and maturing lines rather than just one. Each of these drying and maturing lines comprises a thermal processing unit 52, and a modified atmospheric conditions processing unit 100, with a processing chamber 1 including an inner conveying device 7, input and output gate devices 3, 8, and input and output transfer means 21, 22, 24, 25 similar to those described above in relation with FIG. 1. At the start of the two drying and maturing lines, an input distributor 63 is arranged to distribute trays B loaded with slivers or slices of foodstuff coming from loading unit 51 to thermal processing units 52 of the two drying and maturing lines. Preferably, to regulate the transit of loaded trays B between the loading unit 51 and the input distributor 63, a first intermediate storage device 57 is arranged. Similarly, at the end of the two drying and maturing lines, an output distributor 64 is arranged to distribute loaded trays B coming from the processing chamber 1 of each of said drying and maturing lines to the unloading unit 53. In a manner similar to the one described above in relation to FIG. 1, from the unloading unit, on the one hand, the processed slivers or slices are delivered to an accumulating and cooling device 54 and, on the other hand, empty trays B are delivered to the second empty tray conveyor 56, which is a return conveyor in connection with the first empty tray conveyor 50, which feeds empty trays B to the loading unit 51. Also in this case, the route of the return conveyor includes a tray-washing tunnel 59, an empty tray stacker 60, a tray stack conveyor 61 and an empty tray unstacking device 62.

Optionally, between the exit of the processing chamber 1 and the output distributor 64 of each drying and maturing line, a second intermediate storage device 58 is arranged. In the exemplary embodiment illustrated in FIG. 2, this second intermediate storage device 58 is configured to handle stacks P of trays B rather than individual trays, and is arranged to regulate the transit of stacks P of loaded trays B between the exit of the output regulating chamber 9 and the output unstacking device 25. It is to be noted that, alternatively, the second intermediate storage device 58 of each line could be configured to handle individual trays B and be arranged between the output unstacking device 25 and the output distributor 64.

Optionally, each tray is individually tagged with an identifiable element, such as, for instance, an RFID label, which is identifiable by a radio frequency receiver. In one or more points along the route of trays loaded with foodstuff, a radio frequency receiver associated with auxiliary control means, such as, for example, weighing means is arranged to identify and weigh each of the trays loaded with foodstuff. Information about the change in weight of the tray loaded with foodstuff is indicative, for example, of the degree of moisture loss in the foodstuff and can then be used to control or regulate the operation of one or more of the components of the drying and maturing line located upstream or downstream the point where the last measurement has been taken.

Figure 6:
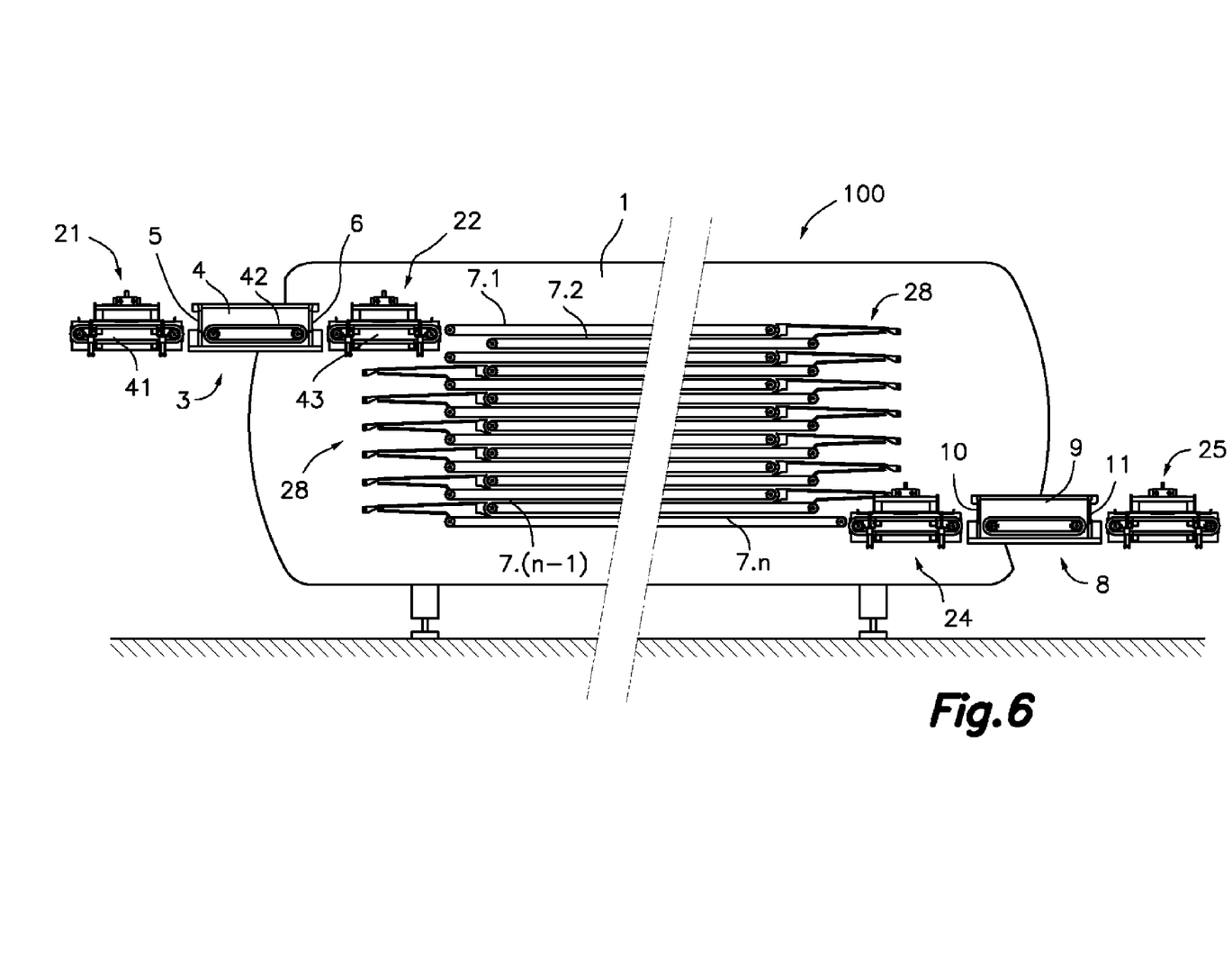
FIG. 6 is a schematic cross-sectional view taken along a longitudinal vertical plane of a modified atmospheric conditions processing unit and input and output transfer means that are a part of the plant for drying and maturing foodstuffs of FIG. 1 or 2.

In relation now to FIG. 6, the configuration of the modified atmospheric conditions processing unit 100 and the operation of the input and output transfer means are described. As described above, the modified atmospheric conditions processing unit 100 comprises a processing chamber 1 connected to conditioning means (not shown) to create modified atmospheric conditions inside it. Processing chamber 1 has an input gate device 3, an output gate device 8 and an inner conveying device 7 for conveying trays B from said input gate device 3 to said output gate device 8.

The input gate device 3 comprises an input regulating chamber 4, an outer input gate 5 arranged between said input regulating chamber 4 and the outside, and an inner input gate 6 arranged between the input regulating chamber 4 and the inside of the processing chamber 1. Outer and inner input gates 5, 6 are connected to drive means (not shown) configured and controlled to open and close them alternately so that, at any time, at least one of them is closed and in some periods both are closed. The input regulating chamber 4 is connected to regulating means operationally controlled to alternately match, in the periods when both outer and inner input gates 5, 6 are closed, the atmospheric conditions inside the input regulating chamber 4 to the outside atmospheric conditions and to the modified atmospheric conditions inside the processing chamber 1. Input transfer means comprise an input stacking device 21 arranged before the input regulation chamber 4 to form stacks P of a predetermined number of trays with the trays B coming from the thermal processing unit 52, an input unstacking device 22 arranged after the input regulating chamber 4 inside the processing chamber 1 to unstack the stacks P of trays and individually deliver trays B to said inner conveying device 7, and an input transfer device arranged to transfer each of said stacks P of trays from said input stacking device 21 to the input unstacking device 22 through the outer and inner input gates 5, 6 and the input regulating chamber 4.

The output gate device 8 is similar to the input gate device 3, and it comprises an output regulating chamber 9, an inner output gate 10 arranged between the inside of the processing chamber 1 and said output regulating chamber 9, and an outer output gate 11 arranged between the output regulating chamber 9 and the outside. Inner and outer output gates 10, 11 are connected to drive means controlled to open and close the inner and outer output gates 10, 11 alternately so that, at any time, at least one of them is closed, including periods when both inner and outer output gates 10, 11 are closed. The output regulating chamber 9 is connected to regulating means operable to match the atmospheric conditions inside the output regulating chamber 9 to the modified atmospheric conditions inside the processing chamber 1 and to the outside atmospheric conditions in alternate periods when both inner and outer output gates 10, 11 are closed. Output transfer means comprise an output stacking device 24 arranged inside the processing chamber 1 before the output regulation chamber 9 to form stacks P of a predetermined number of trays with the trays B coming from the inner conveying device 7, an output unstacking device 25 arranged after the output regulating chamber 9 to unstack the stacks P of trays coming from the output regulating chamber 9 and an output transfer device arranged to transfer each of said stacks P of trays from said output stacking device 24 to the output unstacking device 25 through the inner and outer output gates 10, 11 and the output regulating chamber 9.

The input transfer device comprises a first conveyor 41 installed in the input stacking device 21, a second conveyor 42 installed inside the input regulating chamber 4, and a third conveyor 43 installed in the input unstacking device 22. Similarly, the output transfer device comprises a first conveyor 41 installed in the output stacking device 24, a second conveyor 42 installed inside the output regulating chamber 9, and a third conveyor 43 installed in the output unstacking device 25. Said first and third conveyors 41, 43 installed in the stacking and unstacking devices 21, 22, 24, 25 are, for instance, belt or chain conveyors arranged at the same height. As shown in the embodiment illustrated in FIGS. 9 to 12, the second conveyor 42 installed in regulation chambers 4, 9 comprise a movable support 65 guided and arranged at the same height as the belts or chains of the first and third conveyors 41, 43 and sized to partially pass between them through the gates 5, 6, 10, 11 of regulating chambers 4, 9 when they are open and to partially be accommodated between the two belts or chains of the first and third conveyors 41, 43. This moving support 65 has a first rack 66 attached in its bottom meshing a moving pinion 67 that, in turn, is engaged with a second rack 68 attached on the inside of the corresponding regulating chamber 4, 9. Said moving pinion 67 is installed in a guided carriage (not shown) that can be shifted under the action of drive means to run along the second rack 68, and the turning of the pinion as it rolls along the second rack 68 drives the first rack 66 and the moving support 65 attached to it in the same direction and twice the speed. However, whatever other transfer means, such as belt or chain conveyors, or similar, as shown in the FIG. 6, that could readily occur to someone skilled in the art, are within the scope of the present invention.

The inner conveying device 7 comprises several horizontal superimposed conveyor sections 7.1, 7.2, . . . , 7.$n$-1, 7.$n$, actuated to move in opposite alternate directions. The leading end of the upper conveyor section 7.1 is arranged to receive the trays B from the input unstacking device 22. The leading end of each of the following conveyor sections 7.2, . . . , 7.$n$-1, 7.$n$ is arranged to receive the trays B from the trailing end of the conveyor section 7.1, 7.2, . . . , 7.$n$-1 immediately above, and the trailing end of the lower conveyor section 7.$n$ is arranged to deliver trays to the output stacking device 24. At the end of each conveyor section 7.1, 7.2, . . . , 7.$n$-1, except at the end of the lower conveyor section 7.$n$, an inner conveying device 28 is arranged for transferring the trays B to the conveyor section 7.2, . . . , 7.$n$-1, 7.$n$ immediately below. This way, the various conveyor sections 7.1, 7.2, . . . , 7.$n$-1, 7.$n$ provide a route for trays B inside the processing chamber 1 much longer than the length of the same. The advance rate of the trays B inside the processing chamber 1 is selected to provide a desired processing time for the processing of the slivers or slices S of foodstuff under modified atmospheric conditions. In the illustrated exemplary embodiment, the inner transfer devices 28 use gravity to transfer a tray B from one conveyor section to the next, and for this reason trays travel downwards from the upper conveyor section to the lower conveyor section. However, using motorised inner transfer devices it would be possible to build an inner conveying device with several superimposed conveyor sections where the trays might travel upwards from the lower section to the upper conveyor section.

Figure 7:
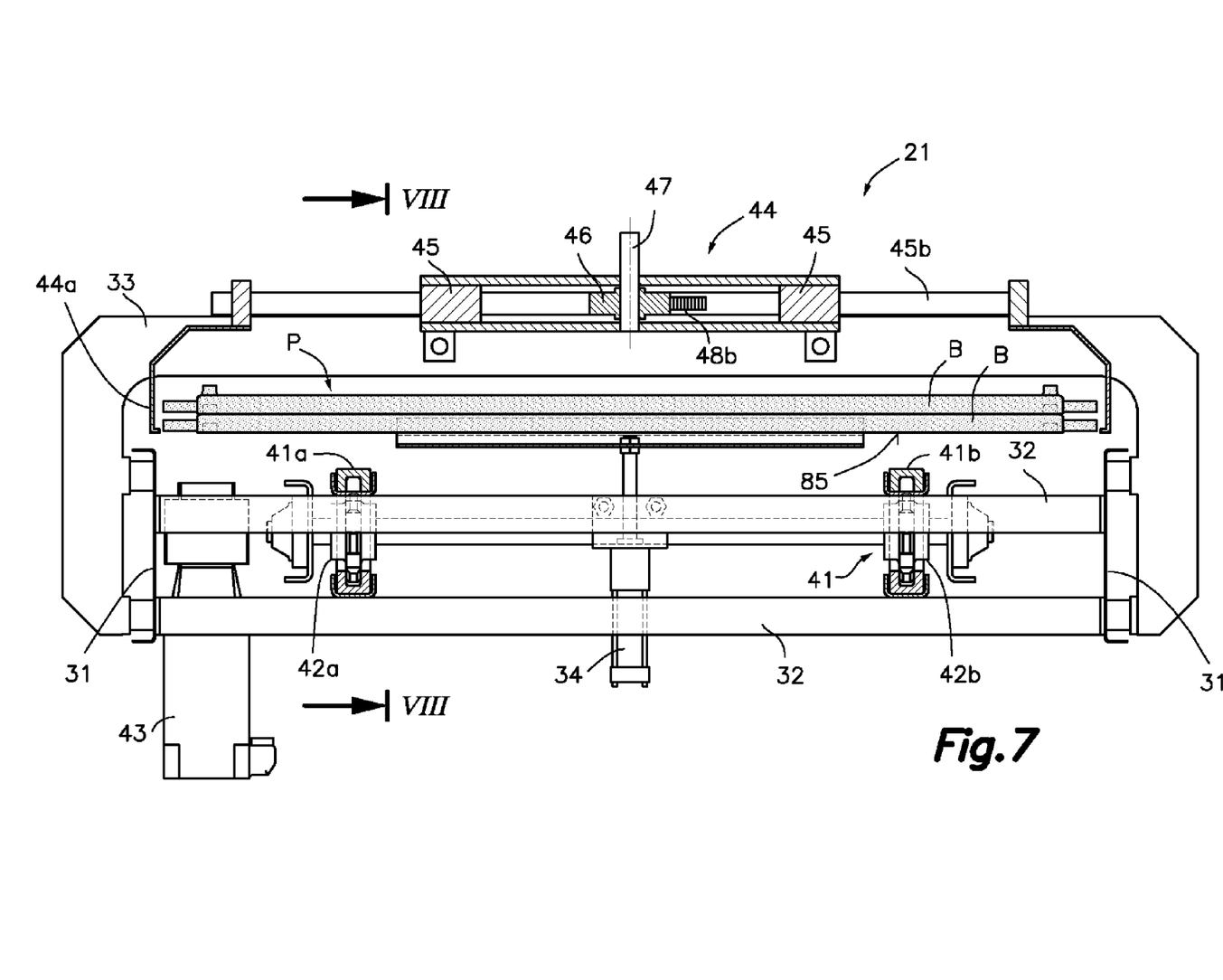
FIG. 7 is a cross-sectional view, taken along a plane indicated by the line VII-VII in FIG. 8, of a stacking/unstacking device that is a part of the transfer means of FIG. 6.
Figure 8:
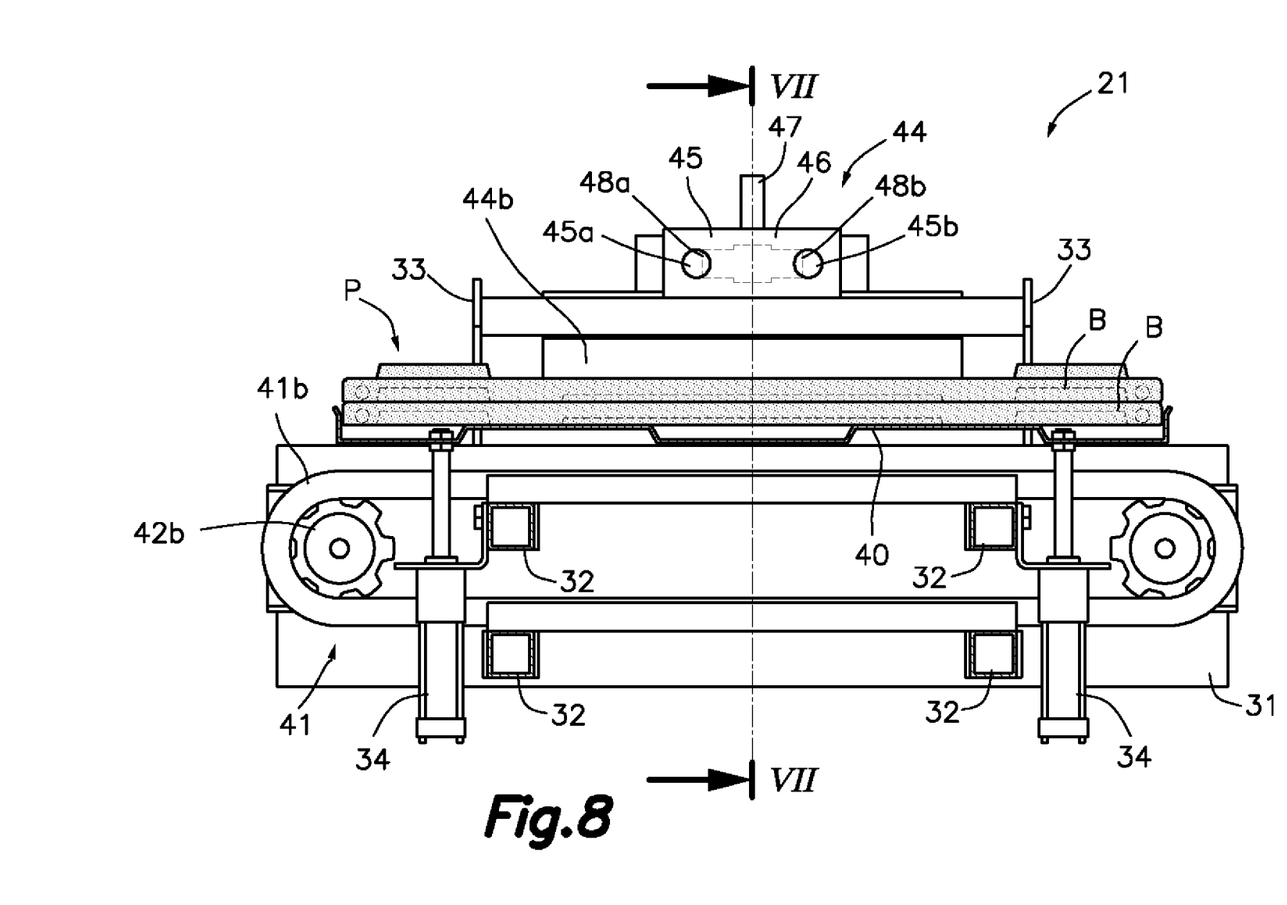
FIG. 8 is a cross-sectional view taken along a plane indicated by the line VIII-VIII in FIG. 7.

Next, in relation to FIGS. 7 and 8, the constitution and functioning of the input stacking device 21 is described. It must be borne in mind that, in the illustrated exemplary embodiment, the input stacking and unstacking devices 21, 22 and the output stacking and unstacking devices 24, 25 have the same construction, and, making them work in reverse, they can act as a stacking device or an unstacking device. Therefore, only the detailed description of the input stacking device 21 is included with the understanding that said description can likewise be used for the input unstacking device 22 and the output stacking and unstacking devices 24, 25.

The input stacking device 21 has, according to the illustrated embodiment, a structure made up of a pair of side plates 31 arranged in a direction parallel to the direction of the line advance, transverse members 32 that internally connect the side plates 31, and transverse ribs 33 externally linking the side plates 31 by establishing a bridge above them. In this structure, between the two side plates 31, a belt or chain conveyor 41 is supported with a pair of parallel belts or chains 41$a$, 41$b$, supported and guided by two pairs of wheels 42$a$, 42$b$, the wheels of each pair being connected by an axle. A motor 43 (FIG. 7) is arranged to drive said wheels 42$a$, 42$b$ and, thereby, to jointly move the belts or chains 41$a$, 41$b$. The belts or chains 41$a$, 41$b$ are configured and arranged to directly support an underside 85 of a tray B, without making use of the support shanks of tray B. This way, tray B can be moved horizontally in the direction of the line advance by the belts or chains 41$a$, 41$b$. In the transverse members 32 of the structure linear actuators 34 are attached fitted with respective moving shanks connected to a lifting platform 40, which is arranged between said two moving belts or chains 41$a$, 41$b$. The activation of said linear actuators 34 allows for the vertical movement of a tray B from a lower position (not shown), wherein tray B is supported on the moving belts or chains 41$a$, 41$b$, up to an upper position (FIGS. 7 and 8), wherein tray B is in a sufficiently high position so as not to interfere with another tray B that might be supported on the moving belts or chains 41$a$, 41$b$, and vice versa.

Logically, in order to allow for the introduction of a new tray B supported on the moving belts or chains 41$a$, 41$b$, it is necessary for the moving platform 33 to have previously descended to a position below an upper surface of the moving belts or chains 41$a$, 41$b$. To that end, on the top of the bridge formed by the transverse ribs 33, a gripping device 44 is installed fitted with side lugs 44$a$, 44$b$ connected to guide means and drive means configured to simultaneously move the side lugs 44$a$, 44$b$ in opposite directions between an open position (FIGS. 7 and 8) and a closed position (not shown), such that the side lugs 44$a$, 44$b$ are capable of keeping tray B in said upper position without interfering with said lifting platform 40. In addition, the side lugs 44$a$, 44$b$ are configured so that they provide room for one or more subsequent trays B piled up on top of the tray B that is being held, forming a stack P of a predetermined number of trays. Obviously, the side lugs 44$a$, 44$b$ are also capable of releasing tray B being held when the lifting platform has raised to the top position.

In the illustrated embodiment, side lugs 44$a$, 44$b$ of gripping device 44 are connected to respective guide and actuation bars 45$a$, 45$b$ slidingly installed in holes of guide blocks 45 supported on the transverse ribs 33. A pinion 46 attached to a shaft 47 is supported between these guide and actuation bars 45$a$, 45$b$ and simultaneously meshed on opposite sides with rack gear toothings 48$a$, 48$b$ respectively formed in the guide and actuation bars 45$a$, 45$b$. A motor or another actuator (not shown) is connected to cause the shaft 47 to rotate, thereby moving the side lugs 44$a$, 44$b$ between open and closed positions.

To form stacks P of trays B with the device acting as a stacker, a co-ordinated action of the drive means of moving belts or chains 41$a$, 41$b$, the lifting platform 40 and the side lugs 44*a*, 44*b* allows the following sequence. Firstly, a first tray B is introduced by means of the moving belts or chains 41*a*, 41*b*; next, this first tray B is lifted to the top position by means of the moving platform 33; the first tray B is then grabbed in the top position by means of the side lugs 44*a*, 44*b*; the lifting platform 40 is returned to the lower position; then, a second tray B is introduced by means of the moving belts or chains 41*a*, 41*b*; next, this second tray B is lifted to the top position by means of the moving platform 33, so the second tray B engages the first tray B by its underside and pushes it upwards, forming a stack P of two trays while the side lugs 44*a*, 44*b* release the first tray B; the second tray B is then grabbed in the top position by means of the side lugs 44*a*, 44*b* and the lifting platform 40 is returned to the lower position, and so on until a stack P with a desired number of trays is completed. Finally, the entire stack P thus formed can be transferred by opening the side lugs 44*a*, 44*b*, thereby causing the stack P to descend by means of the lifting platform 40 and moving it in the line advance direction by means of the moving belts 41*a*, 41*b*. When the device acts as an unstacking device, the drive means of moving belts or chains 41*a*, 41*b*, the lifting platform 40 and the side lugs 44*a*, 44*b* are controlled to carry out a reverse sequence, initially receiving a stack P of trays B and then unstacking stack P to deliver trays B individually.

Next, with reference to FIGS. 9 to 12, a cycle in the operation of the input gate device 3 and the associated transfer means is described. In the illustrated embodiment, the operating cycle of the output gate device 8 and the corresponding transfer means is analogous, although in a reverse sequence relative to the cycle of operation of the input gate device 3 and the corresponding transfer means, so that the following description is considered to be valid for both.

Figure 9:
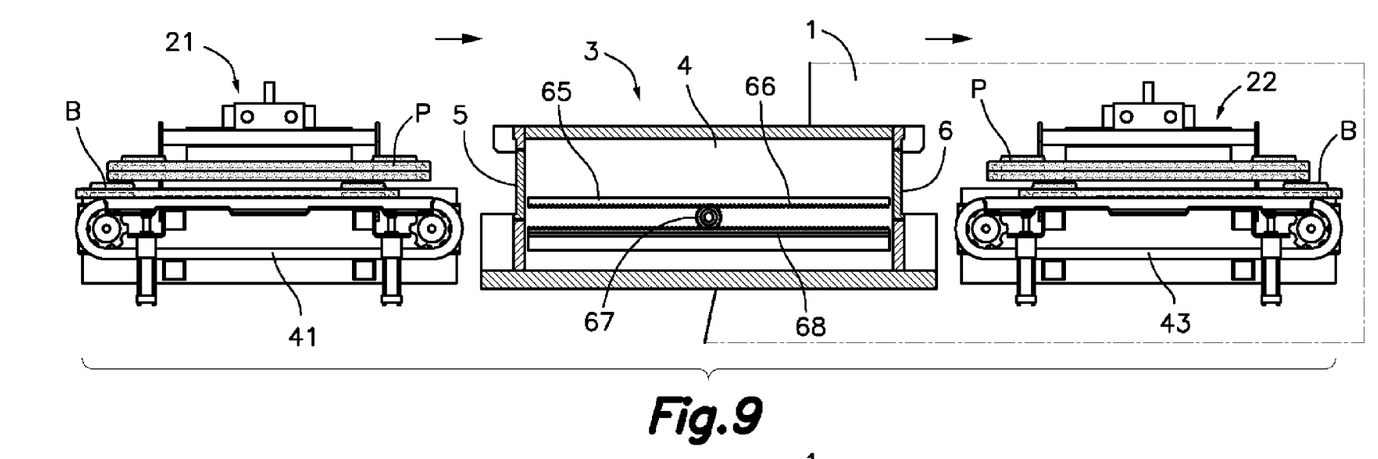
FIGS. 9 to 12 are schematic sectional side views of an input gate device of the modified atmospheric conditions processing unit and of input transfer means, illustrating a sequence of steps in a cycle of introduction of trays.

In FIG. 9, input regulating chamber 4 is empty and both its outer and inner input gates 5, 6 are closed, while the regulating means are activated in order to match the atmospheric conditions inside the input regulating chamber 4 to the atmospheric conditions outside before the outer input gate 5 is opened. Meanwhile, a stack P of three trays B is being formed in the input stacking device 21 with trays coming from the thermal processing unit 52 (not shown in FIGS. 9 to 12), and the input unstacking device 22 arranged inside the processing chamber 1 starts unstacking a stack P of three trays B previously introduced and delivering individual trays B to the inner conveying device 7 (not shown in FIGS. 9 to 12).

Figure 10:
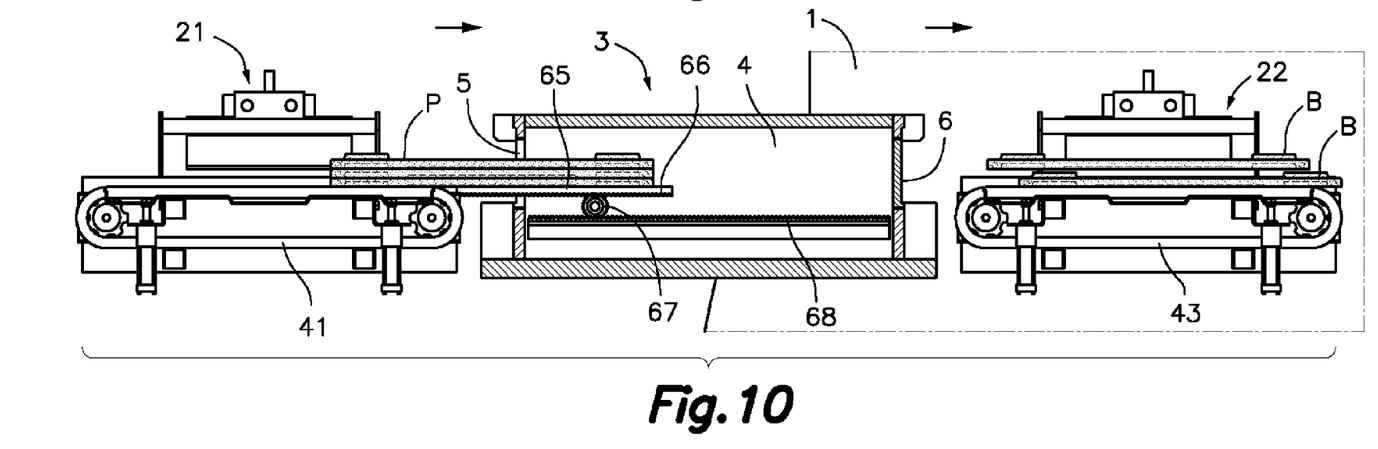

As shown in FIG. 10, once the atmospheric conditions inside the input regulating chamber 4 are the same as the atmospheric conditions outside, the outer input gate 5 is opened and the stack P, newly formed by the input stacking device 21, is transferred inside the input regulating chamber 4 through the outer input gate 5 by means of a combined actuation of the first and second conveyors 41, 42. Meanwhile, the input unstacking device 22 goes on unstacking previously introduced stack P.

Figure 11:
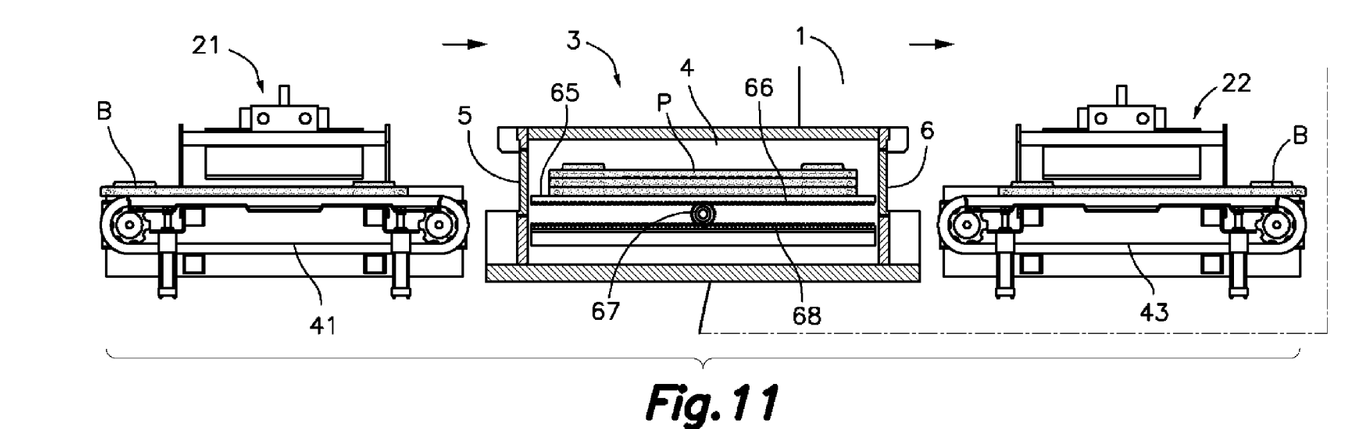

Next, as shown in FIG. 11, when tray stack P has entered the input regulating chamber 4, the outer input gate 5 is closed, while the inner input gate 6 remains closed as well, such that stack P is enclosed inside the input regulating chamber 4. Regulating means are then activated to match the atmospheric conditions inside the input regulating chamber 4 to the modified atmospheric conditions inside processing chamber 1 before the inner input gate 6 is opened. Meanwhile, a tray B coming from heating unit 52 enters the input stacking device 21 to begin a new stack P and one last tray B of previously introduced stack P is delivered by the input unstacking device 22 to inner conveyor 7.

Figure 12:
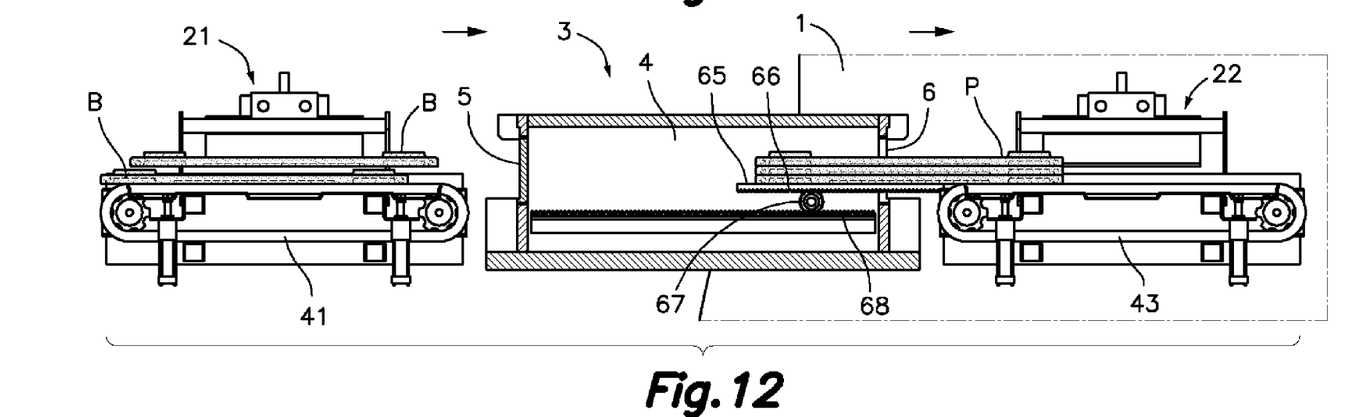

Next, as shown in FIG. 12, once the atmospheric conditions inside the input regulating chamber 4 are the same as the modified atmospheric conditions inside processing chamber 1, the inner input gate 6 is open and the stack P that was in the input regulating chamber 4 is transferred through the inner input gate 6 by means of the combined actuation of the second and third conveyors 42, 43. Meanwhile, the input stacking device 21 continues to build a new stack P with trays B coming from heating unit 52. Finally, when the input regulating chamber 4 is clear, the inner input gate 6 is closed and the situation returns once again to that shown in FIG. 9.

Referring now to FIGS. 13-16, a description is provided of the constitution and a representative sequence of the operation of the inner transfer devices 28 arranged at the end of each conveyor section 7.2, 7.*n*−1 (except at the end of the lower conveyor section 7.*n*) of inner conveyor 7 inside the processing chamber 1. The leading end of each conveyor section 7.2, . . . , 7.*n*−1, 7.*n* (except the leading end of the upper conveyor section 7.*n*) protrudes from the trailing end of the conveyor section 7.1, 7.2, . . . , 7.*n*−1 immediately above. For greater clarity of the drawing, in FIGS. 13 to 16 only the trailing end of the upper conveyor section 7.1 and the leading end of the conveyor section 7.2 immediately below are depicted. Each conveyor section comprises a pair of belts or chains fitted with holding configurations, such as, for instance projections defining notches, suitable for engaging the support shanks 84 of tray B, thereby ensuring its positive dragging, in a way similar to that depicted in FIG. 5. Between the two chains or belts, heating plates 76 adjacent to the path of the underside of the support surface 82 of trays B are arranged to heat the foodstuff arranged on them. These heating plates 76 can comprise, for instance, a circuit for a heated heat-transfer fluid. Each inner transfer device 28 comprises a first arrangement of guides 29*a* between the trailing end of the upper conveyor section 7.1 and a pivoting support 30, a second arrangement of guides 29*b* between said pivoting support 30 and the leading end of the conveyor section 7.2 immediately below and a third arrangement of guides 29*c* surrounding a part of a wheel 71 that supports and guides the trailing end of the upper conveyor section 7.1. The pivoting support 30 is installed so that it can pivot around an axis between an upper position, aligned with the first arrangement of guides 29*a*, and a lower position, aligned with the second arrangement of guides 29*b*. In the illustrated embodiment, an elastic element 35 is arranged to bias the pivoting support 30 towards said upper position, although, alternatively, a counterweight can be used for the same purpose.

Figure 13:
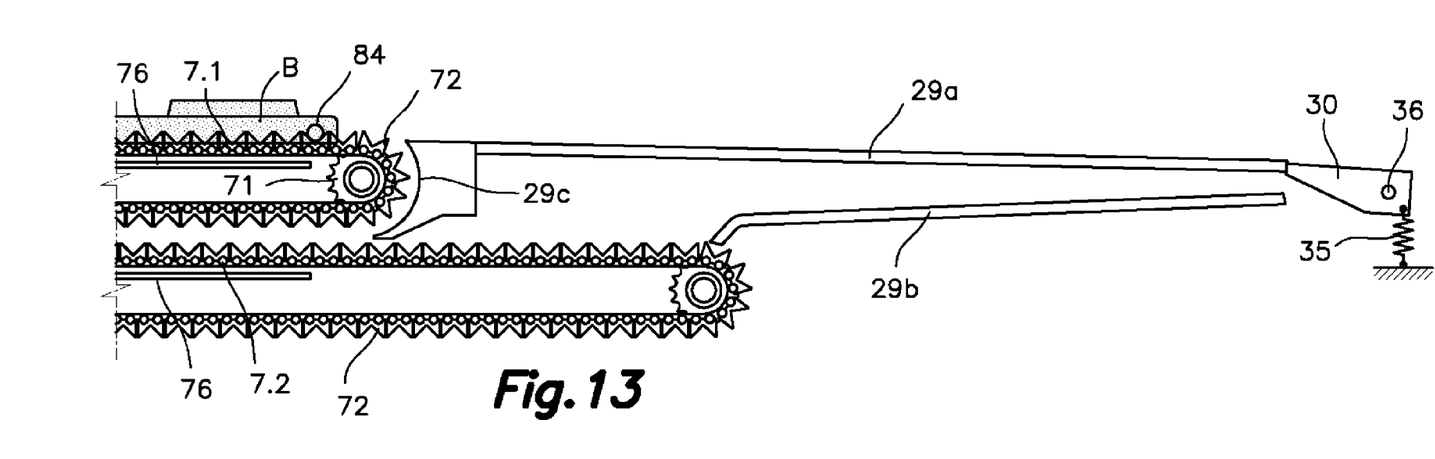
FIGS. 13 to 16 are schematic side views of an inner transfer device installed in a processing chamber that is a part of the modified atmospheric conditions processing unit, illustrating a sequence of steps in a transfer operation of trays from an upper conveyor section to a lower conveyor section.

In FIG. 13 a tray B is partially shown being transported by the upper conveyor section 7.1 and approaching the trailing end of this upper conveyor section 7.1. Support shanks 84 of tray B are fitted in the notches formed in the holding configurations 72 attached to the belts or chains of the conveyor section. For greater clarity of the drawing, in FIGS. 13 to 16 only one tray B is shown and other trays that usually come before and go after the tray B shown in FIG. 13 are not shown.

Figure 14:
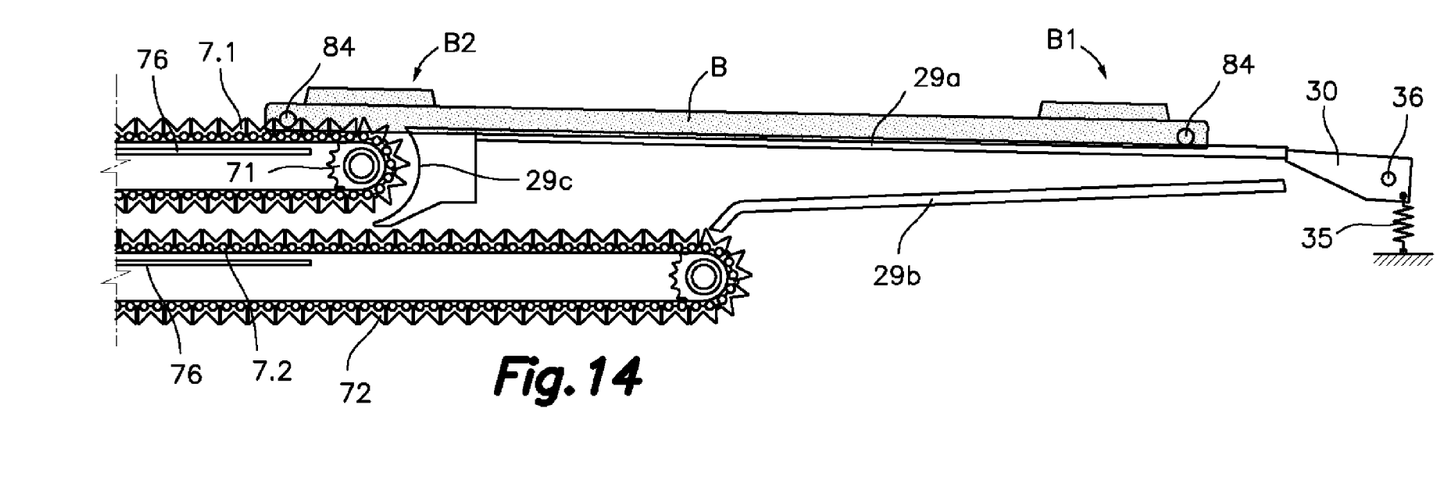

Next, as shown in FIG. 14, a first end B1 of tray B, which is located in a forward position according to the movement of the upper conveyor section 7.1, has surpassed the trailing end of upper conveyor section 7.1 and the support shanks 84 associated with this first end B1 of tray B have escaped from holding configurations 72 of the belts or chains and are now supported by the first arrangement of guides 29*a* and guided towards the pivoting support 30 while the support shanks 84 associated to a second end B1 of tray B, which is located in a rearward position according to movement of the upper conveyor section 7.1, are still fitted in the holding configurations 72 of the belts or chains and they are pushed by the latter. For instance, in the same axle carrying the wheels 71, which support and guide the belts or chains at the trailing end of the upper conveyor section 7.1, one or more supporting wheels (not shown) are installed which are sized and positioned to support the underside 85 of tray B, thereby preventing the support shanks 84 associated to the first end B1 of tray B from taking the path defined by the third arrangement of guides 29c around the trailing end of the upper conveyor section 7.1, and ensuring that, on the contrary, they take the path defined by the first arrangement of guides 29a.

Figure 15:
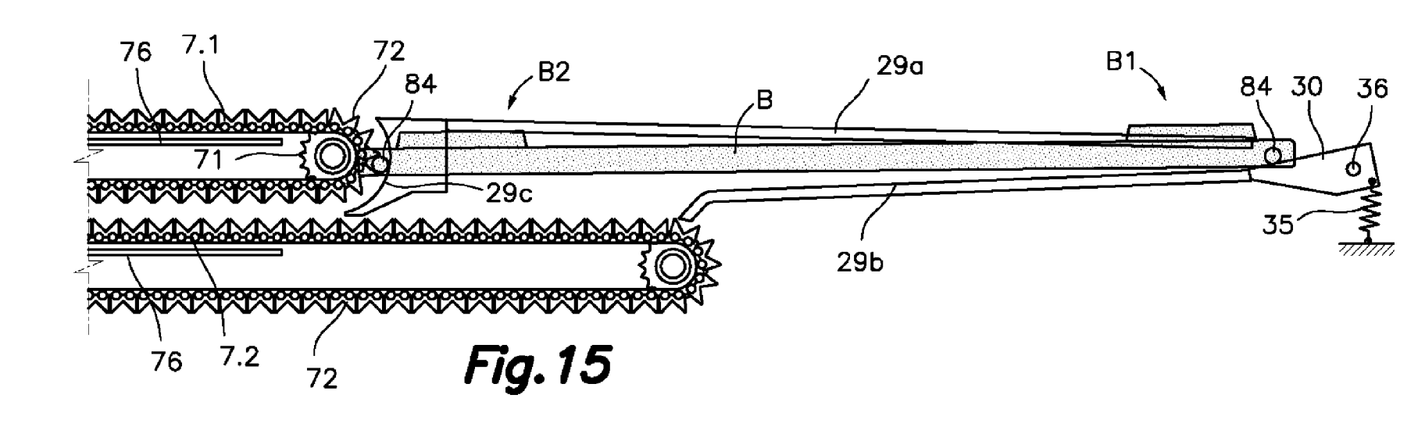

In FIG. 15, the first end B1 of the tray has reached the end of the first arrangement of guides 29a and the support shanks 84 associated with this first end B1 are now supported on the pivoting support 30. The pivoting support 30 changes position under the weight of tray B and is arranged now at the level of the second arrangement of guides 29b. At the same time, the second end B2 of the tray has reached the trailing end of the upper conveyor section 7.1 and, since the afore-mentioned supporting wheels cannot now contact the underside 85 of tray B, the support shanks 84 associated with this second end B2 take the path defined by the third arrangement of guides 29c without ceasing to be fitted in and pushed by the holding configurations 72 of the belts or chains of the upper conveyor section 7.1, such that the second end B2 of tray B, which has gone from being located in the rear to being located in the forward position according to the movement of the conveyor section 7.2 immediately below, is led towards the leading end of the conveyor section 7.2 immediately below.

Figure 16:
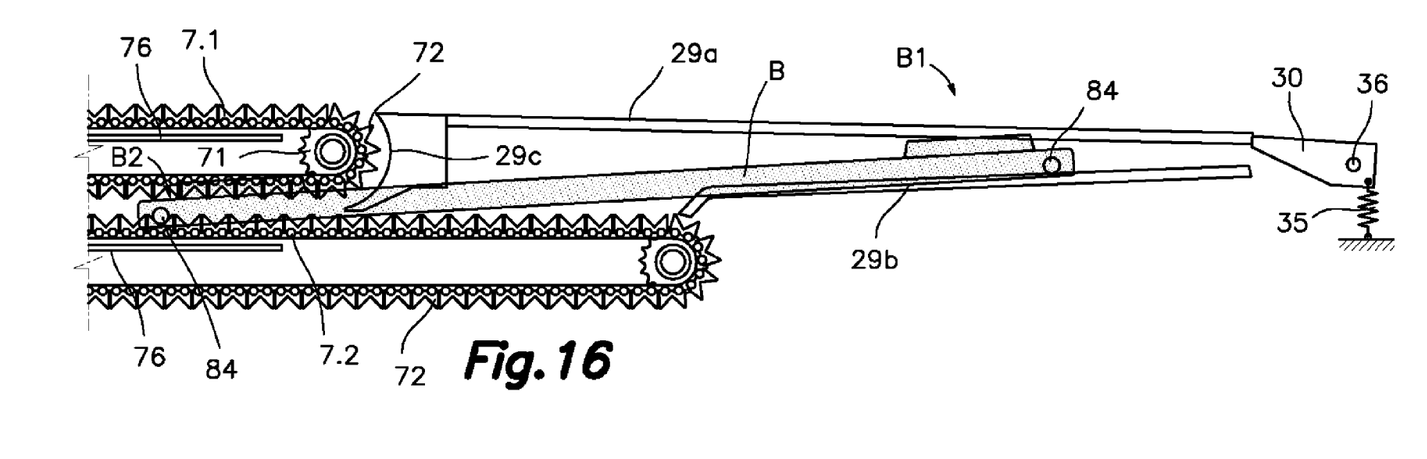

In FIG. 16, the support shanks 84 associated with the second end B2 of tray B will have been fitted in holding configurations 72 of the belts or chains of the conveyor section 7.2 immediately below, so they push the tray in the direction of the movement of the conveyor section 7.2 immediately below, opposite to the direction of movement of the upper conveyor section 7.1. As a result, the support shanks 84 associated to the first point B1 of tray B, which has gone to being located now in the rear position, have taken the path defined by the second arrangement of guides 29b so that the first end B1 of tray B will be led by the second arrangement of guides 29b towards the leading end of the conveyor section 7.2 immediately below, until the support shanks 84 associated to the first end B1 are also fitted in the holding configurations 72 of the belts or chains of the conveyor section 7.2 immediately below. The elastic element 35 returns the pivoting support 30 to the upper position.

A person skilled in the art will be able to make modifications and variations from the exemplary embodiments shown and described without departing from the scope of the present invention as defined in the appended claims.

The invention claimed is:

1. A plant for drying and maturing foodstuffs, comprising:
input conveyor means to convey trays loaded with portions of a foodstuff;
a processing chamber with conditioning means to create modified atmospheric conditions inside it, said processing chamber having an input gate device, an output gate device and an inner conveying device for conveying trays from said input gate device to said output gate device along a route inside the processing chamber, said input gate device comprising an input regulating chamber, an outer input gate between said input regulating chamber and the outside, and an inner input gate arranged between the input regulating chamber and the inside of the processing chamber, drive means to alternately open and close said outer and inner input gates such that, at any time, at least one of them is closed, and regulating means operable to match the atmospheric conditions inside the input regulating chamber to the outside atmospheric conditions before the outer input gate is opened and to the modified atmospheric conditions inside the processing chamber before the inner input gate is opened; and
input transfer means configured to introduce said trays from said input conveyor means into the processing chamber through the input gate device,
characterised in that said input transfer means comprise:
an input stacking device arranged before the input regulating chamber to form stacks of a predetermined number of trays with the trays coming from the input conveyor means;
an input unstacking device arranged after the input regulating chamber inside the processing chamber to unstack stacks of trays and deliver the trays individually to said inner conveying device; and
an input transfer device arranged to transfer each of said stacks of trays from said input stacking device to the input regulating chamber when the outer input gate is open, to keep each stack of trays in the input regulating chamber with the outer and inner input gates closed long enough to allow for matching the atmospheric conditions inside the input regulating chamber to the modified atmospheric conditions inside the processing chamber, and to transfer each stack of trays from the input regulating chamber to said input unstacking device when the inner input gate is open.

2. The plant, according to claim 1, wherein said output gate device comprises an output regulating chamber, an inner output gate between the inside of the processing chamber and said output regulating chamber, an outer output gate arranged between the output regulating chamber and the outside, drive means to alternately open and close said inner and outer output gates such that, at any time, at least one of them is closed, and regulating means operable to match the atmospheric conditions inside the output regulating chamber to the modified atmospheric conditions inside the processing chamber before the inner output gate is opened and to the outside atmospheric conditions before the outer output gate is opened; and in that it includes output transfer means comprising:
an output stacking device arranged inside the processing chamber before the output regulating chamber to form stacks of a predetermined number of trays with the trays coming from the inner conveying device;
an output unstacking device arranged after the output regulating chamber to unstack stacks of trays and deliver the trays individually to output conveyor means; and
an output transfer device arranged to transfer each of said stacks of trays from said output stacking device to the output regulating chamber when the inner output gate is open, to keep each stack of trays in the output regulating chamber with the inner and outer output gates closed long enough to allow for matching the atmospheric conditions inside the output regulating chamber to the outside atmospheric conditions, and to transfer each stack of trays from the output regulating chamber to said output unstacking device when the outer output gate is open.

3. The plant, according to claim 2, further comprising, upstream of said input stacking device:
a loading unit that includes a slicer for cutting the foodstuffs into slivers or slices and a loading device to load said slivers or slices on successive trays coming from a first empty tray conveyor; and a thermal processing unit, which includes a thermal processing enclosure in connection with means for air circulation at a controlled temperature that cause the air to circulate at said controlled temperature through said heating enclosure, and a device to feed loaded trays, coming from said loading unit along a route inside the thermal processing enclosure and towards said input stacking device, and, downstream from said output unstacking device:

an unloading unit that includes a device to unload the slivers or slices of foodstuff from the trays coming from the output unstacking device; delivering the slivers or slices to an accumulating and cooling device; and delivering the empty trays to a second empty tray conveyor; and a packaging unit to pack the slivers or slices coming from said unloading unit.

4. The plant, according to claim 3, wherein at least one first intermediate storage device is arranged to regulate the transit of loaded trays between said loading unit and said thermal processing unit.

5. The plant, according to claim 3, wherein at least one second intermediate storage device is arranged to regulate the transit of loaded trays between the output unstacking device and said unloading unit.

6. The plant, according to claim 3, wherein at least one second intermediate storage device is arranged to regulate the transit of stacks of loaded trays between the output regulating chamber and the output unstacking device.

7. The plant, according to claim 3, wherein said second empty tray conveyor is a return conveyor configured and arranged to cause the empty trays to go through a tray-washing tunnel and deliver the clean, empty trays to said first empty tray conveyor.

8. The plant, according to claim 7, wherein an empty tray stacking device is arranged to form stacks of a predetermined number of trays with the clean, empty trays coming from the second empty tray conveyor, an empty tray unstacking device is arranged to unstack stacks of clean, empty trays coming from said empty tray stacking device and individually deliver clean, empty trays to the first empty tray conveyor, and a tray stack conveyor is arranged to convey stacks of clean, empty trays from the empty tray stacking device to said empty tray unstacking device.

9. The plant, according to claim 3, further comprising:

a plurality of drying and maturing lines, each one comprising a thermal processing unit and a processing chamber with an inner conveying device, input and output gate devices and input and output transfer means;

an input distributor to distribute trays loaded with portions of a foodstuff coming from said input conveyor means to the thermal processing unit of each of said drying and maturing lines; and an output distributor to distribute loaded trays coming from the processing chamber of each of said drying and maturing lines to said unloading unit.

10. The plant, according to claim 2, wherein each of said input stacking device, input unstacking device, output stacking device and output unstacking device comprises:

a belt or chain conveyor with at least two moving parallel belts or chains arranged to support the underside of a tray and driven to move the tray horizontally in a line advance direction;

a lifting platform arranged between said two moving belts or chains and driven to vertically move a tray from a lower position, wherein the tray is supported on the moving belts or chains, up to an upper position, wherein the tray does not to interfere with another tray supported on the moving belts or chains, and vice versa; and side lugs arranged and driven to clamp a tray in said upper position without interfering with said lifting platform and with room for one or more subsequent trays piled up on top of the tray, forming a stack, and to release said tray.

11. The plant, according to claim 10, wherein each of said input and output transfer devices comprises a first conveyor that is said belt or chain conveyor installed in the input or output stacking device, a second conveyor installed inside the input or output regulating chamber, which comprises a moving support driven by a pinion and racks mechanism, and a third conveyor, which is said belt or chain conveyor installed in the input or output unstacking device.

12. The plant, according to claim 1, wherein said inner conveying device comprises several superimposed horizontal conveyor sections actuated to move in opposite alternate directions and with the leading end of each conveyor section, except the leading of the upper conveyor section, arranged to receive the trays from the trailing end of the conveyor section immediately above to provide a route for trays inside the processing chamber longer than the length of the same, an inner transfer device being arranged at the end of each conveyor section, except at the end of the lower conveyor section, to transfer the trays to the conveyor section immediately below.

13. The plant, according to claim 12, wherein the leading end of each conveyor section of the inner conveyor protrudes from the trailing end of the conveyor section immediately above, and in that said inner transfer device comprises a first arrangement of guides to guide a first end of each tray located in a forward position beyond the trailing end of the corresponding conveyor section up to a limit position wherein said first end of the tray, now located in a rearward position, escapes from the first arrangement of guides and is supported by a pivoting support that pivots to cause the first end of the tray to pass to a second guide device, which will guide it to the leading end of the conveyor section immediately below, while a second end of the tray goes from being located in a rearward position to a forward position in a third arrangement of guides that will guide it around the trailing end of the conveyor section until it is placed on the conveyor section immediately below.

14. The plant, according to claim 2, wherein said inner conveying device comprises several superimposed horizontal conveyor sections actuated to move in opposite alternate directions and with the leading end of each conveyor section, except the leading of the upper conveyor section, arranged to receive the trays from the trailing end of the conveyor section immediately above to provide a route for trays inside the processing chamber longer than the length of the same, an inner transfer device being arranged at the end of each conveyor section, except at the end of the lower conveyor section, to transfer the trays to the conveyor section immediately below.

15. The plant, according to claim 14, wherein the leading end of each conveyor section of the inner conveyor protrudes from the trailing end of the conveyor section immediately above, and in that said inner transfer device comprises a first arrangement of guides to guide a first end of each tray located in a forward position beyond the trailing end of the corresponding conveyor section up to a limit position wherein said first end of the tray, now located in a rearward position, escapes from the first arrangement of guides and is supported by a pivoting support that pivots to cause the first end of the tray to pass to a second guide device, which will guide it to the leading end of the conveyor section immediately below, while a second end of the tray goes from being located in a rearward position to a forward position in a third arrangement of guides that will guide it around the trailing end of the conveyor section until it is placed on the conveyor section immediately below.

16. A method of foodstuffs transfer applicable to the plant for drying and maturing foodstuffs according to claim 1, characterised in that it comprises the steps of:
- forming stacks of a predetermined number of trays with trays loaded with slivers or slices of foodstuff coming from input conveyor means;
- consecutively introducing stacks of trays in an input regulating chamber provided with outer and inner input gates at the entrance of a processing chamber through said outer input gate while said inner input gate is closed;
- closing the outer input gate and matching the atmospheric conditions inside the input regulating chamber to modified atmospheric conditions inside the processing chamber;
- opening the inner input gate and transferring the stack of trays inside the processing chamber; and
- unstacking the stacks of trays and delivering individual trays to an inner conveying device arranged inside the processing chamber.

* * * * *